US009175592B2

(12) United States Patent
Tsunooka et al.

(10) Patent No.: US 9,175,592 B2
(45) Date of Patent: Nov. 3, 2015

(54) CONTROL DEVICE FOR INTERNAL COMBUSTION ENGINE

(75) Inventors: Takashi Tsunooka, Gotenba (JP); Shigemasa Hirooka, Susono (JP); Shinichi Mitani, Susono (JP); Akira Satou, Susono (JP); Shigeyuki Urano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 13/148,599

(22) PCT Filed: Apr. 16, 2009

(86) PCT No.: PCT/JP2009/057668
§ 371 (c)(1),
(2), (4) Date: Aug. 9, 2011

(87) PCT Pub. No.: WO2010/119543
PCT Pub. Date: Oct. 21, 2010

(65) Prior Publication Data
US 2012/0059566 A1    Mar. 8, 2012

(51) Int. Cl.
*F01N 5/02* (2006.01)

(52) U.S. Cl.
CPC ............... *F01N 5/02* (2013.01); *F01N 2240/02* (2013.01); *F01P 2060/16* (2013.01); *Y02T 10/16* (2013.01)

(58) Field of Classification Search
CPC .......... F02M 25/0728; F02M 25/0731; F02M 25/0738; F02M 25/0753; F01N 3/04; F01N 3/043
USPC ................. 60/320, 321, 286, 278; 73/114.68, 73/114.69, 114.71, 114.76; 123/41.31, 123/40.02, 568.12, 568.22, 676, 677, 678; 701/102, 103, 108
See application file for complete search history.

(56) References Cited

U.S. PATENT DOCUMENTS

| 2,455,493 | A | * | 12/1948 | Jacobs | 60/321 |
| 2,858,667 | A | * | 11/1958 | Reske | 60/321 |
| 3,169,365 | A | * | 2/1965 | Lysle | 60/321 |
| 3,996,793 | A | * | 12/1976 | Topper | 73/118.02 |

(Continued)

FOREIGN PATENT DOCUMENTS

| JP | A-63-208607 | 8/1988 |
| JP | A-2005-188352 | 7/2005 |

(Continued)

OTHER PUBLICATIONS

International Search Report dated Jul. 28, 2009 issued in International Patent Application No. PCT/JP2009/057668 (with translation).

*Primary Examiner* — Hieu T Vo
*Assistant Examiner* — Sherman Manley
(74) *Attorney, Agent, or Firm* — Oliff PLC (57) ABSTRACT

In a control device for an internal combustion engine according to the present embodiment, the control device includes: cooling units arranged on a path where a coolant is circulated, and cooling an exhaust gas of an engine with the coolant flowing through the cooling units; an atmospheric pressure sensor detecting an atmosphere pressure; and ECUs deciding whether or not to perform an exhaust gas temperature control for suppressing a temperature of the exhaust gas based on whether or not a heat quantity is more than a decision value, and correcting the decision value to be lower as the atmosphere pressure is lower.

6 Claims, 8 Drawing Sheets

(56) References Cited

U.S. PATENT DOCUMENTS

| | | | |
|---|---|---|---|
| 4,179,884 A * | 12/1979 | Koeslin | 60/321 |
| 4,711,088 A * | 12/1987 | Berchem et al. | 60/321 |
| 5,148,675 A * | 9/1992 | Inman | 60/321 |
| 5,607,010 A * | 3/1997 | Schonfeld et al. | 165/51 |
| 6,446,498 B1 * | 9/2002 | Schricker et al. | 73/114.74 |
| 6,895,752 B1 * | 5/2005 | Holtman et al. | 60/605.2 |
| 7,143,580 B2 * | 12/2006 | Ge | 60/605.1 |
| 7,287,494 B2 * | 10/2007 | Buck | 123/41.01 |
| 7,454,896 B2 * | 11/2008 | Chalgren et al. | 60/278 |
| 2006/0086089 A1 * | 4/2006 | Ge | 60/599 |
| 2006/0185364 A1 * | 8/2006 | Chalgren et al. | 60/599 |
| 2011/0185716 A1 * | 8/2011 | Kawamoto | 60/321 |

FOREIGN PATENT DOCUMENTS

| | | |
|---|---|---|
| JP | A-2007-132313 | 5/2007 |
| JP | A-2008-111414 | 5/2008 |
| JP | A-2008-274885 | 11/2008 |

* cited by examiner

CONTROL DEVICE FOR INTERNAL COMBUSTION ENGINE

TECHNICAL FIELD

The present invention relates to a control device for an internal combustion engine.

BACKGROUND ART

There is a cooling unit for cooling exhaust gases of an internal combustion engine.

There is the cooling unit which is provided between an exhaust port and an exhaust manifold or which is provided around the exhaust manifold (See Patent Document 1).

The exhaust gases are cooled with coolant water flowing through the cooling unit.

PRIOR ART DOCUMENT

Patent Document

[Patent Document 1] Japanese Patent Application Publication No. 63-208607

SUMMARY OF THE INVENTION

Problems to be Solved by the Invention

The heat quantity is transferred from the exhaust gas to the coolant within the cooling unit. The coolant might boil depending on the transferred heat quantity. In particular, since the boiling point of the coolant becomes lower as the atmosphere pressure is lower, the coolant tends to boil.

It is an object of the present invention to provide a control device of an internal combustion engine suppressing boiling of a coolant.

Means for Solving the Problems

The above object is achieved by a control device for an internal combustion engine, including: a cooling unit arranged on a path where a coolant is circulated, and cooling an exhaust gas of the internal combustion engine with the coolant flowing through the cooling unit; an heat quantity estimation portion estimating a heat quantity transferred from the exhaust gas to the coolant; an atmosphere pressure detection portion detecting an atmosphere pressure; and an engine control portion deciding whether or not to perform an exhaust gas temperature control for suppressing a temperature of the exhaust gas based on whether or not the heat quantity is more than a decision value, and the engine control portion correcting the decision value to be lower as the atmosphere pressure is lower. Since the coolant tends to boil as the atmospheric pressure is lower, the decision value is reduced as the atmospheric pressure is lower. Therefore, the exhaust temperature control is readily performed, thereby preventing boiling of the coolant.

Effects of the Invention

According to the present invention, there is provided a control device of an internal combustion engine suppressing boiling of a coolant.

MODES FOR CARRYING OUT THE INVENTION

Embodiments will be described below with reference to the drawings.

Figure 1:
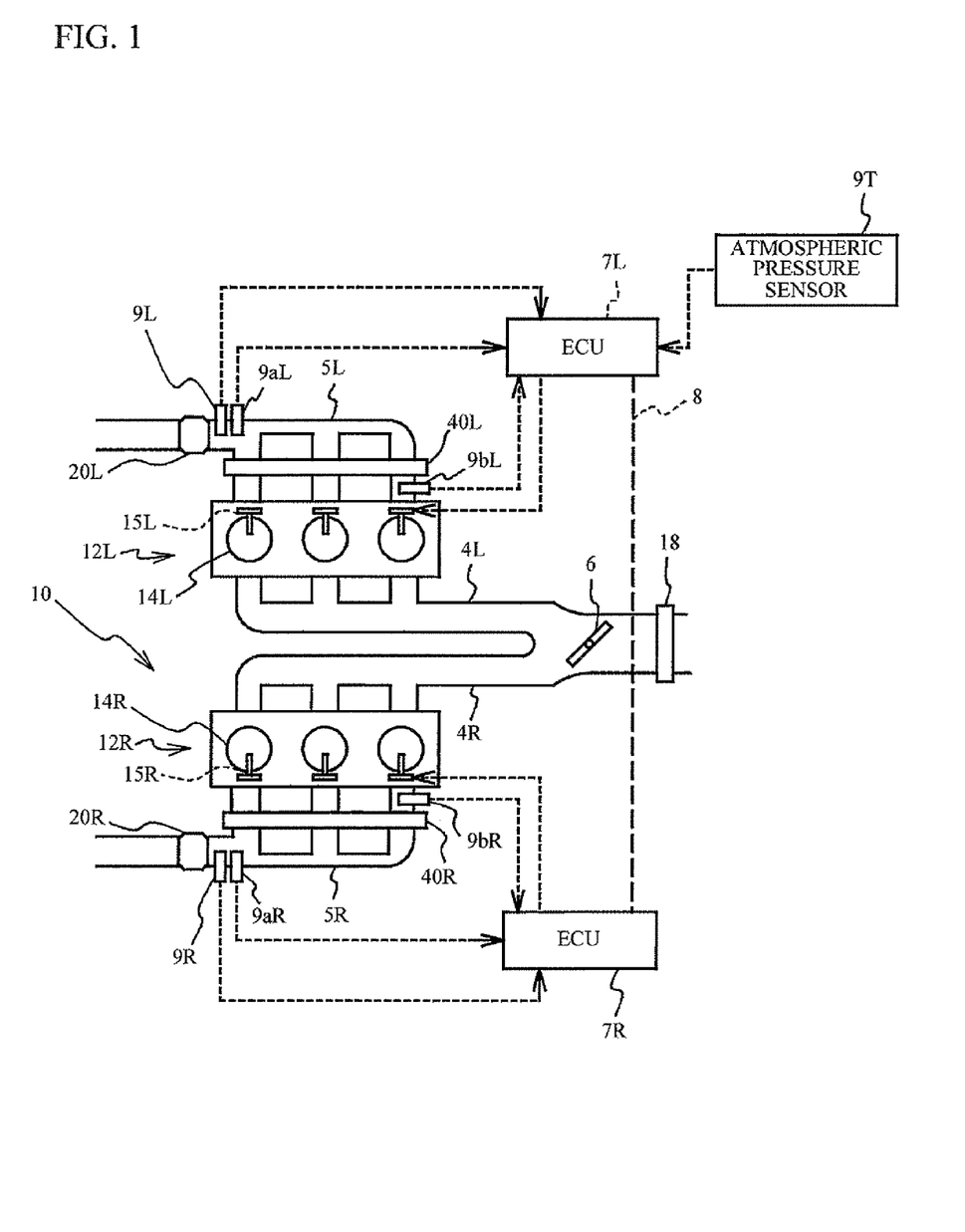
FIG. 1 is an explanatory view of a control device for an internal combustion engine.

FIG. 1 is an explanatory view of a control device for an internal combustion engine. An engine 10 has a pair of banks 12L and 12R. The banks 12L and 12R are arranged obliquely to each other. The engine 10 is so-called V-type engine. The bank 12L has a cylinder group including three cylinders 14L. Likewise, the bank 12R has cylinders 14R.

Also, the bank 12L is provided with fuel injection valves 15L injecting fuel directly into the cylinders 14L. Likewise, the bank 12R is provided with fuel injection valves 15R injecting fuel directly into the cylinders 14R. An intake path 4L and an exhaust manifold 5L are connected to the bank 12L. An intake path 4R and an exhaust manifold 5R are connected to the bank 12R. The intake paths 4L and 4R are jointed to each other at their upstream sides. The jointed portion is provided with a throttle valve 6 for adjusting intake air quantity, and an airflow meter for detecting the intake air quantity.

Catalysts 20L and 20R are provided at the lower ends of the exhaust manifolds 5L and 5R, respectively. The catalysts 20L and 20R clean the exhaust gases exhausted from the cylinders of the banks 12L and 12R, respectively. Air-fuel ratio sensors 9L and 9R are attached to the exhaust manifolds 5L and 5R, respectively.

A cooling unit 40L is provided between an exhaust port (not illustrated) of the bank 12L and the exhaust manifold 5L. Likewise, a cooling unit 40R is provided between an exhaust port (not illustrated) of the bank 12R and the exhaust manifold 5R. The cooling units 40L and 40R correspond to cooling units.

The cooling units 40L and 40R are configured such that the coolant flows around pipes of the exhaust manifolds 5L and 5R respectively. The cooling units 40L and 40R will be described later in detail. Temperature sensors 9$aL$ and 9$bL$ are provided in the exhaust manifold 5L to sandwich the cooling unit 40L. The temperature sensor 9$bL$ is arranged in the upstream side of the cooling unit 40L, and the temperature sensor 9$aL$ is arranged in the downstream side of the cooling unit 40L. Likewise, temperature sensors 9$aR$ and 9$bR$ are provided in the exhaust manifold 5R.

The opening degree of the throttle valve 6 is individually controlled for each of the banks 12L and 12R by electronic Control Units (ECUs) 7L and 7R, respectively. Also, the fuel quantities injected from the fuel injection valves 15L and 15R are individually controlled by the ECUs 7L and 7R respectively. The ECUs 7L and 7R can cut fuel injected from the fuel injection valves 15L and 15R. The ECUs 7L and 7R, as will be described later, correspond to a heat quantity estimation portion and an engine control portion.

Also, air-fuel ratio sensors 9L and 9R output detection signals according to an air-fuel ratio of the exhaust gas to the ECUs 7L and 7R respectively. The ECUs 7L and 7R control each of the fuel injection quantities injected into the cylinders 14L and 14R based on the output signals from the air-fuel ratio sensors 9L and 9R respectively, so as to control the air-fuel ratio to be feed back. Such a control for feeding back the air-fuel ratio is to control the fuel injection quantity or the like such that the detected air-fuel ratio of the exhaust gas is identical to a target air-fuel ratio. The ECUs 7L and 7R can communicate to each other via a telecommunication line 8. In order to control operations of the banks for which the ECUs 7L and 7R are responsible, the ECUs 7L and 7R exchange information via the telecommunication line 8 to refer to information on an operating state of each bank.

The temperature sensors 9aL, 9bL, 9aR, and 9bR output detection signals according to the temperature of the exhaust gas to the ECUs 7L and 7R respectively. The ECU 7L detects the temperature of the exhaust gas before the exhaust gas is cooled by the cooling unit 40L, that is, before the exhaust gas passes through the cooling unit 40L, based on the signals from the temperature sensor 9bL. Also, the ECU 7L detects the temperature of the exhaust gas after the exhaust gas is cooled by the cooling unit 40L, that is, after the exhaust gas passes from the cooling unit 40L, based on the signals from the temperature sensor 9aL. Likewise, the ECU 7R detects the temperatures of the exhaust gas before and after the exhaust gas passes through the cooling unit 40R. Further, an atmospheric pressure sensor 9T outputs detection signals according to an atmospheric pressure to the ECU 7L. The ECU 7L receives the detection signals from the atmospheric pressure sensor 9T, and then sends them to the ECU 7R. In such a manner, the ECUs 7L and 7R can detect the atmospheric pressure.

Figure 2:
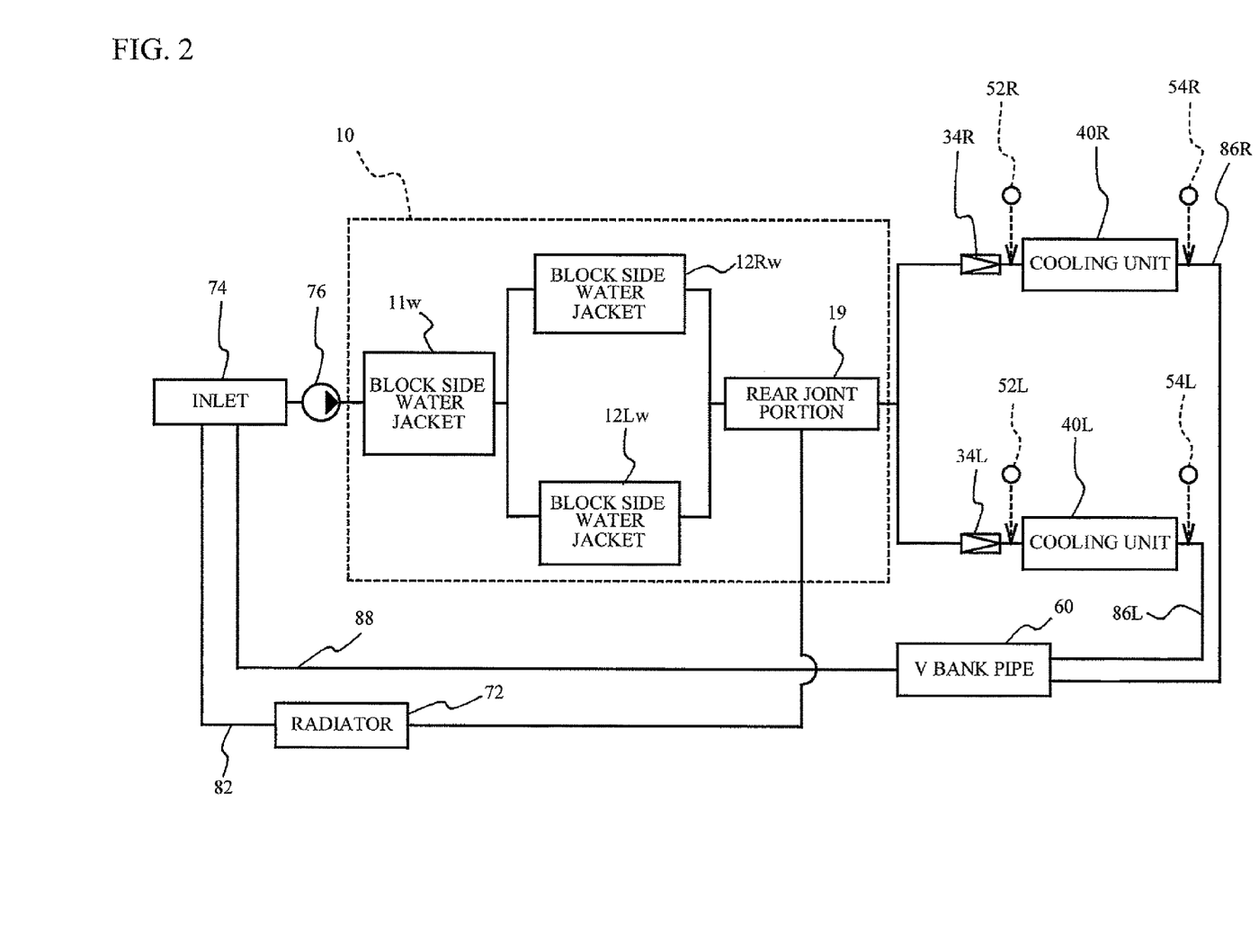
FIG. 2 is a view of a path of a coolant.

FIG. 2 is a view of a path of the coolant. As illustrated in FIG. 2, a radiator 72, an inlet 74, a pump 76, and the like are arranged on the path of the coolant. A main path 82 circulates the coolant through the inlet 74, the pump 76, the engine 10, and the radiator 72, in this order. The main path 82 circulates the coolant to the radiator 72 from a rear joint portion 19 of the engine 10. A supporting path 88 circulates the coolant through the inlet 74, the pump 76, the engine 10, the cooling units 40L and 40R, and a V bank pipe 60, in this order. The supporting path 88 diverges from the rear joint portion 19, and includes divergence paths 86L and 86R which circulate the coolant through the cooling units 40L and 40R respectively.

The pump 76 is an electric type, and operates based on instructions from the ECUs 7L and 7R. The coolant flows from the inlet 74 to the engine 10. The coolant flows into a block side water jacket 11w of the engine 10 at first, and then flows into head side water jackets 12Lw and 12Rw. The coolants discharged from the head side water jackets 12Lw and 12Rw join together at the rear joint portion 19. The main path 82 and the supporting path 88 are connected to the rear joint portion 19. The coolant flowing through the main path 82 flows from the rear joint portion 19 to the radiator 72, and radiates heat in the radiator 72.

The cooling unit 40L and a flow rate sensor 34L are arranged on the divergence path 86L. The coolant flows through the cooling unit 40L. The coolant flows through the cooling unit 40L, thereby reducing a temperature of the exhaust gas exhausted from the cylinders 14L of the bank 12L. Likewise, these arrangements are applicable to the divergence path 86R, a flow rate sensor 34R, and the cooling unit 40R.

Water temperature sensors 52L and 54L are arranged in front and back of the cooling unit 40L, respectively. Likewise, water temperature sensors 52R and 54R are arranged in front and back of the cooling unit 40R, respectively. The water temperature sensors 52L and 54L output detection signals to the ECU 7L, and the water temperature sensors 52R and 54R output detection signals to the ECU 7R. The ECU 7L can detect the temperature of the coolant before the coolant flows into the cooling unit 40L based on the outputs from the water temperature sensor 52L, and the temperature of the coolant after the coolant flows from the cooling unit 40L based on the outputs from the water temperature sensor 54L. Likewise, the ECU 7R can detect the temperatures of the coolants before the coolant flows into the cooling unit 40R and after the coolant flows therefrom based on the outputs from the water temperature sensors 52R and 54R.

Figure 3:
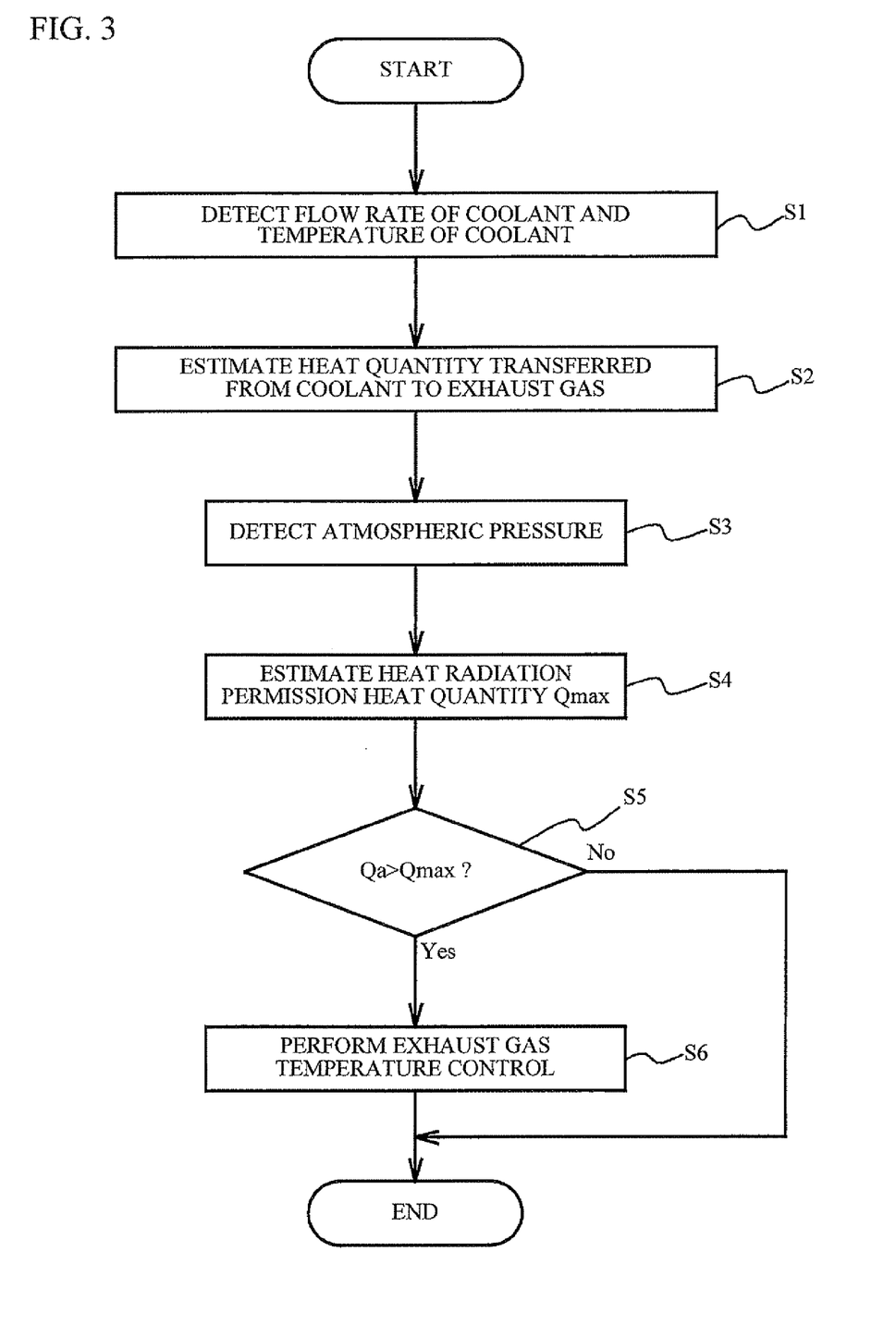
FIG. 3 is a flowchart of an example of a control performed by an ECU.

FIG. 3 is a flowchart of an example of a control performed by the ECUs 7L and 7R. The ECUs 7L and 7R detect the coolant temperature based on the outputs from the water temperature sensors 52L, 54L, 52R, and 54R, and further detect the flow rate based on the outputs from flow sensors 34L and 34R (step S1).

Specifically, the ECU 7L detects a temperature TLin of the coolant before the coolant flows into the cooling unit 40L based on the water temperature sensor 52L and a temperature TLout of the coolant after the coolant flows from the cooling unit 40L based on the water temperature sensor 54L. The ECU 7R detects a temperature TRin of the coolant before the coolant flows into the cooling unit 40R based on the water temperature sensor 52R and a temperature TRout of the coolant after the coolant flows from the cooling unit 40R based on the water temperature sensor 54R. Further, the ECU 7L detects the flow rate QL of the coolant flowing into the cooling unit 40L based on the outputs from the flow sensor 34L. The ECU 7R detects the flow rate QR of the coolant flowing into the cooling unit 40R based on the outputs from the flow sensor 34R.

Next, the ECUs 7L and 7R estimate the heat quantity Qa which transmits from the exhaust gas to the coolant within the cooling units 40L and 40R respectively (step S2). The ECUs 7L and 7R correspond to a heat quantity estimation portion. The heat quantity Qa is estimated by the following formula.

$$Qa = kL \times (TLout - TLin) \times QL + kR \times (TRout - TRin) \times QR \quad (1)$$

In the above formula (1), kL and kR are correction coefficients. Each of correction coefficients kL and kR is set in consideration of a surface area, a heat transfer coefficient, a heat conductivity, and thicknesses of exhaust pipes, of the exhaust system. The surface area of the exhaust system is, for example, a surface area of the exhaust manifold 5L which is exposed to the coolant within the cooling unit 40L. The heat transfer coefficients relate to the exhaust gas and the coolant. The heat conductivity is, for example, one for calculating the heat quantity transferred in the exhaust manifold 5L, and is defined by a material thereof. The thickness of the exhaust pipe is, for example, a thickness of the pipe of the exhaust manifold 5L within the cooling unit 40L.

Next, the ECU 7L detects the atmospheric pressure based on the output signals from the atmospheric pressure sensor 9T (step S3).

Next, the ECUs 7L and 7R estimate the heat radiation permission heat quantity Qmax (step S4). The heat radiation permission heat quantity Qmax is estimated by a following formula.

$$Q\max = k \times kt \times (T\alpha - Ta) \times S \quad (2)$$

In above formula (2), Tα stands for an upper limit temperature of the coolant demanded based on the driving state of the engine 10. The upper limit temperature Tα, for example, is calculated based on a map stored in the ROM of any one of the ECUs 7L and 7R. For example, as for this map, the upper limit temperature Tα of the coolant is associated with the engine revolution number, the engine load, or the like. The upper limit temperature Tα of the coolant is set to the upper limit that does not hinder the driving of the engine 10.

Ta stands for an outside air temperature. For example, the outside air temperature may be calculated based on an outside air temperature sensor (not illustrated) installed into the vehicle, or estimated by another known method. S stands for a radiation area where the coolant radiates heat in such a manner as to expose the radiator 72 to the outside air. k stands for a correction coefficient set in consideration of a heat transfer coefficient, a heat conductivity, a vehicle speed, and the like. The correction coefficient k may be changed in response to the vehicle speed. For example, the correction coefficient k may become greater as the vehicle speed is higher. The heat radiation permission heat quantity Qmax is a heat quantity that can be radiated from the coolant in the radiator 72. The heat quantity capable of being radiated by the radiator 72 is changeable in response to the vehicle speed. According to the above formula (2), the heat radiation permission heat quantity Qmax becomes smaller as the outside air temperature Ta is higher or the radiation surface S of the radiator 72 is smaller.

Figure 4A:
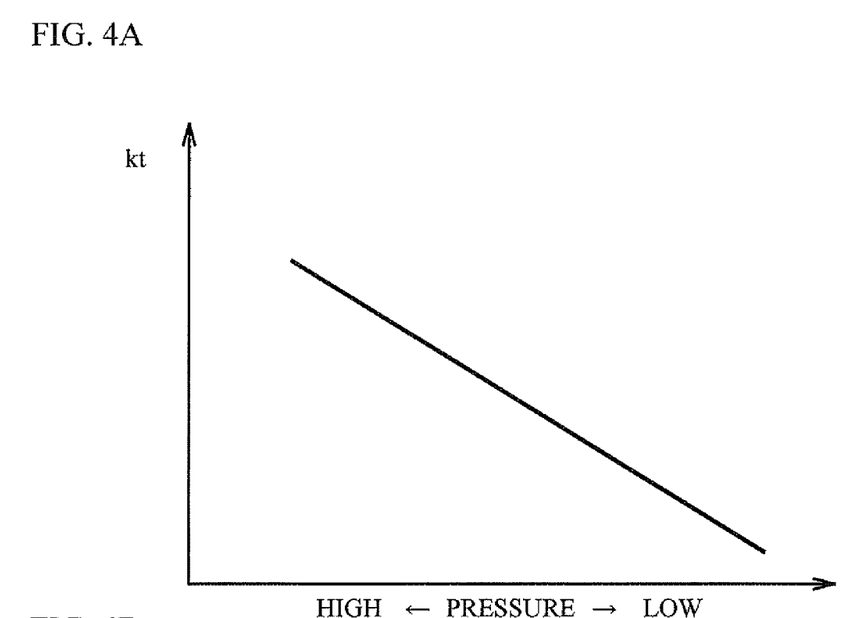
FIG. 4A is a map defining a relationship between an atmospheric pressure and a correction coefficient.
Figure 4B:
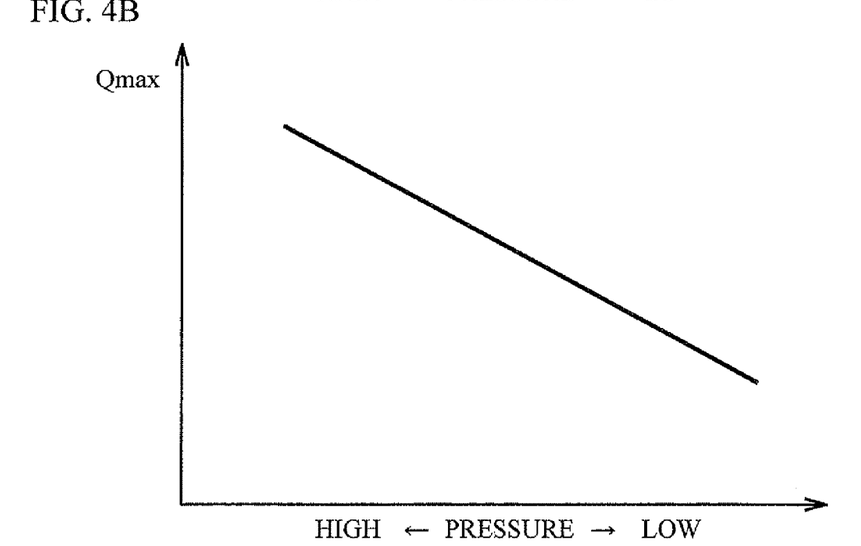
FIG. 4B is a map defining a relationship between the atmospheric pressure and a heat radiation permission heat quantity.

Also, kt stands for a correction coefficient set in consideration of an atmospheric pressure. As for the correction coefficient kt, kt=1 is set when the atmospheric pressure detected by the detection signals from the atmospheric pressure sensor 9T is one atmospheric pressure. kt<1 is set when the atmospheric pressure is less than one atmospheric pressure. kt>1 is set when the atmospheric pressure is more than one atmospheric pressure. FIG. 4A is a map defining a relationship between the atmospheric pressure and the correction coefficient kt. This map is stored in the ROM of the ECU 7L or 7R. As illustrated in FIG. 4A, the correction coefficient kt is smaller as the atmospheric pressure is smaller. FIG. 4B is a map defining a relationship between the atmospheric pressure and the heat radiation permission heat quantity Qmax. As illustrated in FIG. 4B, the heat radiation permission heat quantity Qmax becomes smaller as the atmospheric pressure is smaller.

Next, the ECUs 7L and 7R decide whether or not the heat quantity Qa is more than the heat radiation permission heat quantity Qmax (step S5). When the heat quantity Qa is less than the heat radiation permission heat quantity Qmax, the ECUs 7L and 7R finish a series of processes. When the heat quantity Qa is more than the heat radiation permission heat quantity Qmax, the ECUs 7L and 7R perform an exhaust gas temperature control (step S6). The heat radiation permission heat quantity Qmax corresponds to a decision value for being used for deciding whether or not to perform the exhaust gas temperature control.

The exhaust gas temperature control is a control for suppressing an increase in the exhaust gas temperature. Specifically, the exhaust gas temperature control is a control for controlling an air-fuel ratio toward a rich side, by controlling an injection fuel quantity, as compared with an air-fuel ratio at an normal feedback control is performed. The exhaust gas temperature control may be a control for suppressing the increase in the exhaust gas temperature by limiting an intake air quantity. For example, the intake air quantity is limited such that the opening degree of the throttle valve 6 is less than a constant value. Therefore, the amount of burned fuel is reduced, thereby suppressing the increase in the exhaust gas temperature.

The heat quantity transferred from the coolant to the exhaust gas within the cooling units 40L and 40R are suppressed by suppressing the exhaust gas temperature. Therefore, the heat quantity of the coolant is maintained to be capable of being radiated in the radiator 72. In such an above manner, a reduce in the cooling efficiency of the exhaust is suppressed.

Figure 5A:
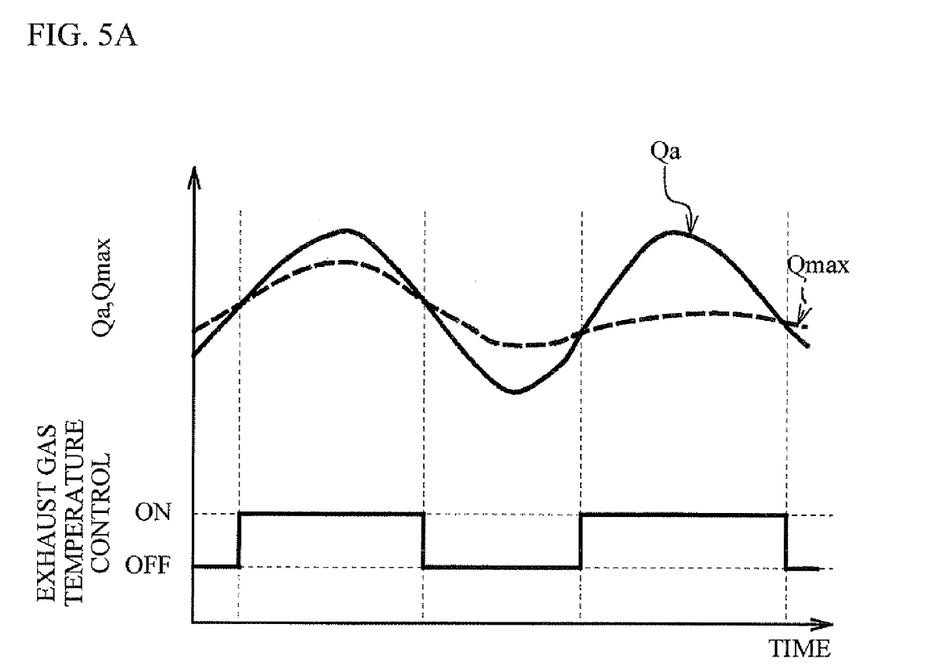
FIGS. 5A and 5B are timing charts of an exhaust gas temperature control.
Figure 5B:
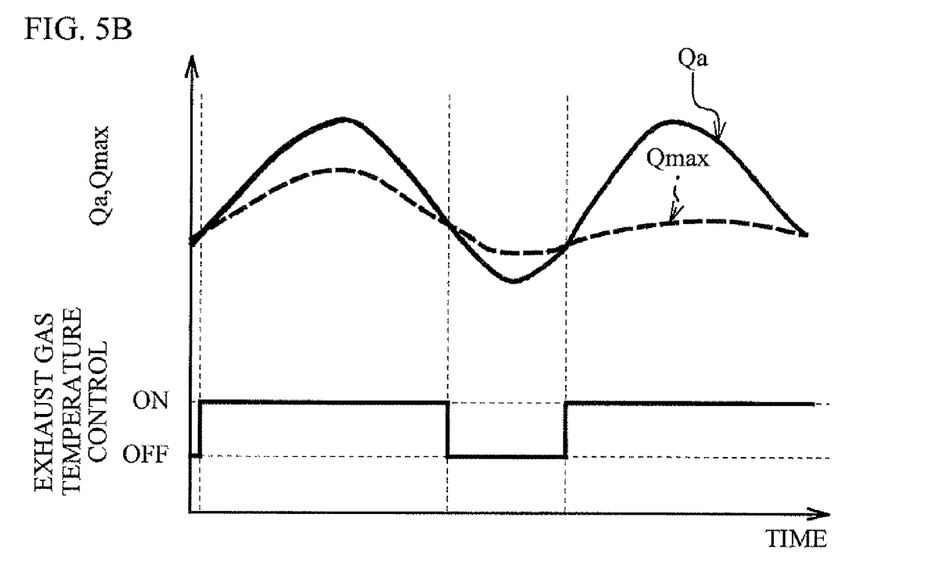

FIGS. 5A and 5B are timing charts of the exhaust gas temperature control. FIG. 5A illustrates the timing chart in cases where the atmospheric pressure is one, and FIG. 5B illustrates the timing chart in cases where the atmospheric pressure is less than one. Although the heat radiation permission heat quantity Qmax is variable in response to the driving state, the exhaust temperature gas control is performed only when the heat radiation permission heat quantity Qmax is more than the heat quantity Qa. This can suppress the degradation of the emission caused by performing the exhaust gas temperature control.

According to the above formulas (2), the heat radiation permission heat quantity Qmax becomes lower as the atmospheric pressure is lower, as illustrated in FIGS. 5A and 5B. Therefore, the period during the exhaust gas temperature control is performed is longer as the atmospheric pressure is lower. The reason is as follows. The boiling point of the coolant is lower as the atmospheric pressure is lower. For example, the situation where it is easy that the coolant boils on highlands more easily than on lowlands. For this reason, when the heat radiation permission heat quantity Qmax is calculated out of consideration of the atmospheric pressure, the coolant might boil. However, the heat radiation permission heat quantity Qmax is corrected based on the atmospheric pressure, thereby preventing boiling of the coolant.

Next, a variation of an estimation method of the heat quantity Qa will be described. In the following, the variation of the formula to estimate the heat quantity Qa will be described.

$$Qa = kvL \times (TvLout - TvLin) \times QvL + kvR \times (TvRout - TvRin) \times QvR \quad (3)$$

The above formula (3) estimates the heat quantity Qa from the exhaust temperature. kvL and kvR are correction coefficients. Each of the correction coefficients kvL and kvR are set in consideration of, the surface area, the heat transfer coefficient, the heat conductivity, and the thickness of the exhaust pipe of the exhaust system.

TvLout stands for the temperature of the exhaust gas after the exhaust gas passes through the cooling unit 40L, and is detected by the temperature sensor 9aL. TvLin stands for the temperature of the exhaust gas before the exhaust gas passes through the cooling unit 40L, and is detected by the temperature sensor 9bL. TvRout stands for the temperature of the exhaust gas after the exhaust gas passes through the cooling unit 40R, and is detected by the temperature sensor 9aR. TvRin stands for the temperature of the exhaust gas before the exhaust gas passes through the cooling unit 40R, and is detected by the temperature sensor 9bR. QvL and QvR stand for the flow rates of the exhaust gas passing through the cooling units 40L and 40R, respectively. The ECUs 7L and 7R detect the exhaust gas flow rates QvL and QvR based on the outputs from exhaust flow sensors (not illustrated) provided in the exhaust manifolds 5L and 5R, respectively. The exhaust flow sensors are known. When the above formula (3)

is useful, in cases where it is impossible to provide the water temperature sensors for detecting the temperatures of the coolant before and after the coolant flows into the cooling units 40L and 40R.

Next, a method for estimating the heat quantity Qa without detecting the exhaust gas flow rate will described. The heat quantity Qa can be estimated without detecting the exhaust gas flow rate by using the following formula.

$$Qa = kvL \times (TvLout - TvLin) \times Ga/2 + kvR \times (TvRout - TvRin) \times Ga/2 \quad (4)$$

In above formula (4), Ga stands for an intake air quantity. In the above formula (4), it is supposed that half of the intake air quantity detected by the airflow meter 18 is introduced to each of the banks 12L and 12R and the intake air quantity Ga is proportional to the exhaust gas flow rate. The above formula (4) is useful, in cases where the exhaust gas flow rate sensor cannot be provided.

Next, a description will be given of a method for estimating the heat quantity Qa without detecting the temperature of the exhaust gas before the exhaust gas passes through the cooling units 40L and 40R. The heat quantity Qa can be estimated without detecting the temperature of the exhaust gas before the exhaust gas passes through the cooling units 40L and 40R by use of the following formula.

$$Qa = kvL \times (TvLout - Tv0) \times QvL + kvR \times (TvRout - Tv0) \times QvR \quad (5)$$

Tv0 stands for the exhaust gas temperature estimated based on the driving state of the engine 10. For example, the ECUs 7L and 7R estimate the exhaust gas temperature Tv0 based on a map where the exhaust gas temperature is associated with the revolution number, the fuel injection quantity, the load of the engine 10, and the like. This arrangement is useful in cases where the temperature sensors 9bL and 9bR cannot be provided.

Next, a description will be given of a method for estimating the heat quantity Qa without detecting the exhaust flow rate or detecting the temperature of the exhaust gas before the exhaust gas passes through the cooling units 40L and 40R. The heat capacity Qa can be estimated without detecting the exhaust flow rate or detecting the temperature of the exhaust gas before the exhaust gas passes through the cooling units 40L and 40R.

$$Qa = kvL \times (TvLout - Tv0) \times Ga/2 + kvR \times (TvRout - Tv0) \times Ga/2 \quad (6)$$

This arrangement is useful in cases where the sensor for detecting the exhaust flow rate or the temperature sensors 9bL and 9bR cannot be provided.

Next, a first variation of the exhaust gas temperature control will be described below. In the exhaust gas temperature control according to the first variation, the heat radiation permission heat quantity Qmax is calculated by the following formulas.

$$Qmax = k \times kt \times ks \times (T\alpha - Ta) \times S \quad (7)$$

ks is a correction coefficient, and is changeable in response to whether or not the exhaust gas temperature control is being performed. When the exhaust gas temperature control is not performed, ks=1 is established. When the exhaust gas temperature control is being performed, an arbitrary value that satisfies 0<ks<1 is employed. Therefore, the heat radiation permission heat quantity Qmax in cases where the exhaust gas temperature control is being performed is smaller than the heat radiation permission heat quantity Qmax in cases where the exhaust gas temperature control is not performed.

Figure 6A:
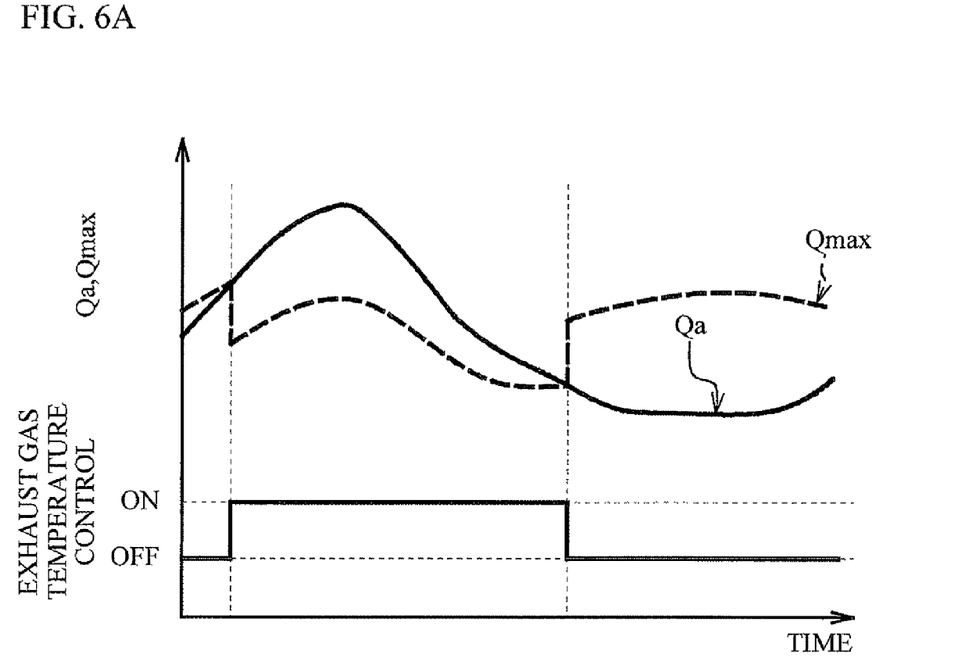
FIG. 6A is a timing chart of a first variation of the exhaust gas temperature control.

FIG. 6A is a timing chart of the exhaust gas temperature control according to the first variation. The heat radiation permission heat quantity Qmax in cases where the exhaust gas temperature control is being performed is corrected to be smaller than the heat radiation permission heat quantity Qmax in cases where the exhaust gas temperature control is not performed. Therefore, the period while the exhaust gas temperature control is performed becomes longer, as compared with cases where the heat radiation permission heat quantity Qmax is calculated by the above formula (2) without consideration of the performance of the exhaust gas temperature control.

The reasons why the heat radiation permission heat quantity Qmax is corrected is as follows. In cases where the heat radiation permission heat quantity Qmax is calculated by the above formula (2) without consideration of the performance of the exhaust gas temperature control, even when the heat quantity Qa is lower than the heat radiation permission heat quantity Qmax and the exhaust gas temperature control is stopped, the heat quantity might be higher than the heat radiation permission heat quantity Qmax again. If the heat quantity Qa is lower than or higher than the heat radiation permission heat quantity Qmax for, a short period, the exhaust gas temperature control is performed and stopped repeatedly within a short period. This might degrade the drivability.

However, the heat radiation permission heat quantity Qmax in cases where the exhaust gas temperature control is being performed is corrected to be small, whereby the period while the exhaust gas temperature control is performed is made longer. This can suppress the heat quantity transferred from the exhaust gas to the coolant and prevent boiling of the coolant. Also, the heat quantity Qa is lower than the heat radiation permission heat quantity Qmax, which is corrected while the exhaust gas temperature control is being performed, and then the exhaust gas temperature control is stopped and the heat radiation permission heat quantity Qmax is calculated as its original value again. This can prevent the exhaust gas temperature control from being performed again for a short period after the exhaust gas temperature control is stopped. It is thus possible to prevent the drivability from degrading.

Figure 6B:
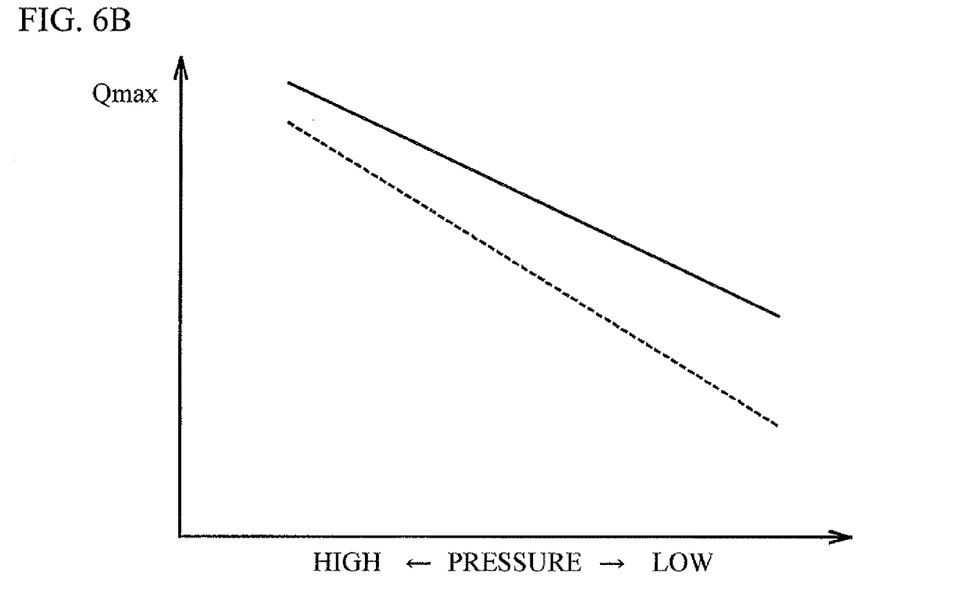
FIG. 6B is a map defining a relationship between the atmospheric pressure and the heat radiation permission heat quantity.

Also, the difference is larger between the heat radiation permission heat quantity Qmax in cases where the exhaust gas temperature control is not performed and the heat radiation permission heat quantity Qmax in cases where the exhaust gas temperature control is performed, as the atmospheric pressure is lower. Specifically, the correction coefficient ks of the above formula (7) is set to be smaller as the atmospheric pressure is lower. That is, the amount of the correction of the heat radiation permission heat quantity Qmax is changed depending on the atmospheric pressure. FIG. 6B is a map defining a relationship between the atmospheric pressure and the heat radiation permission heat quantity Qmax. The solid lines indicate the heat radiation permission heat quantity Qmax in cases where the exhaust gas temperature control is not performed. The dashed lines indicate the heat radiation permission heat quantity Qmax in cases where the exhaust gas temperature control is being performed. The reason why the amount of the correction is larger as the atmospheric pressure is lower is as follows. The coolant readily boils as the atmospheric pressure is lower. For this reason, the heat radiation permission heat quantity Qmax in cases where the exhaust gas temperature control is being performed is corrected to be small as the atmospheric pressure, whereby the exhaust gas temperature control can be performed for a long period.

This is because this can prevent boiling of the coolant.

Figure 7:
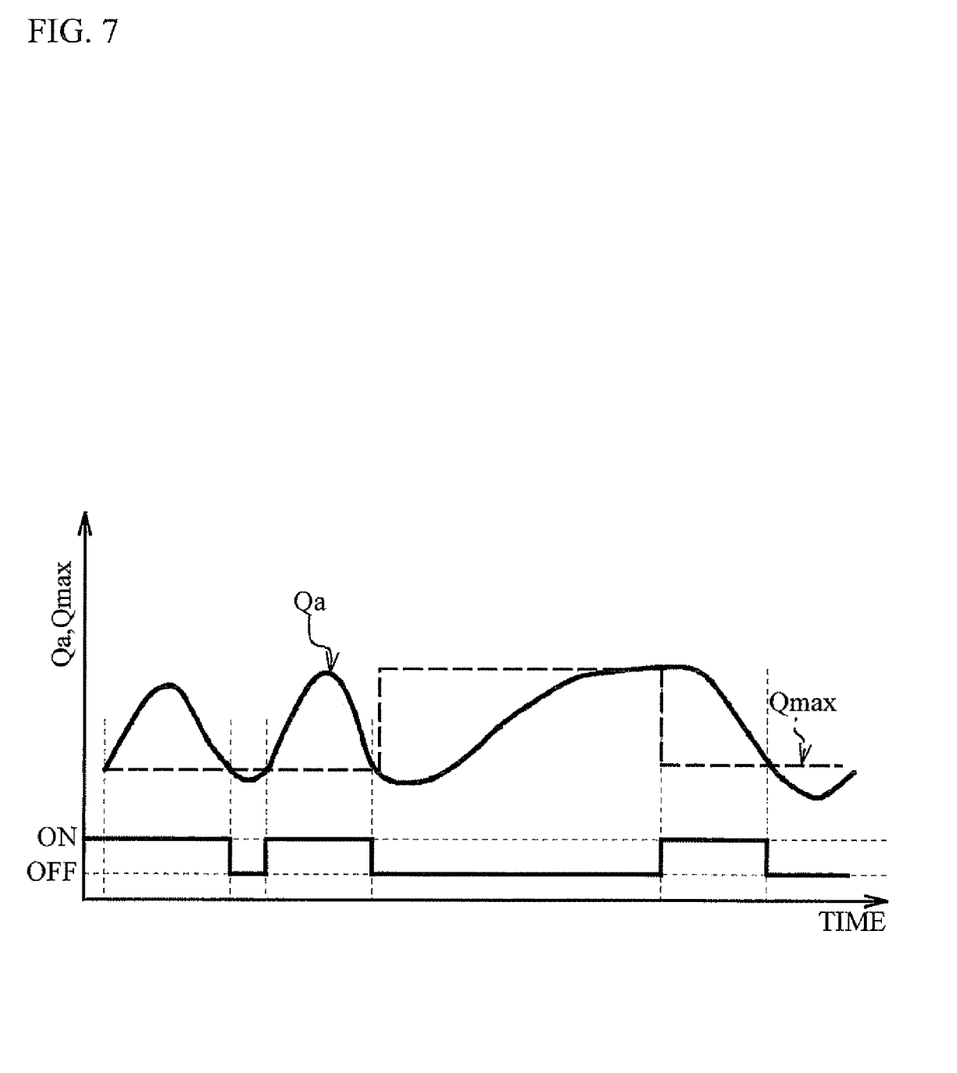
FIG. 7 is a timing chart of a second variation of the exhaust gas temperature control.

Next, a second variation of the exhaust gas temperature control will be described below. In the exhaust gas temperature control according to the second variation, the heat radiation permission heat quantity Qmax is calculated by the above formula (2). However, the ECUs 7L and 7R correct the heat radiation permission heat quantity Qmax for a given period after the exhaust gas temperature control is finished to be larger than the heat radiation permission heat quantity Qmax while the exhaust gas temperature control is being performed. For example, the heat radiation permission heat quantity Qmax is corrected by multiplying the heat radiation permission heat quantity Qmax by a value more than one, for a given period after the exhaust gas temperature control is finished.

FIG. 7 is a timing chart of the exhaust gas temperature control according to the second variation. As for the exhaust gas temperature control according to the second variation as illustrated in FIG. 7, the heat radiation permission heat quantity Qmax is corrected to be large, after the exhaust gas temperature control has been performed twice for a given period. This can prevent the exhaust gas temperature control from performing and stopping repeatedly several times, and prevent the degradation of the drivability.

Figure 8:
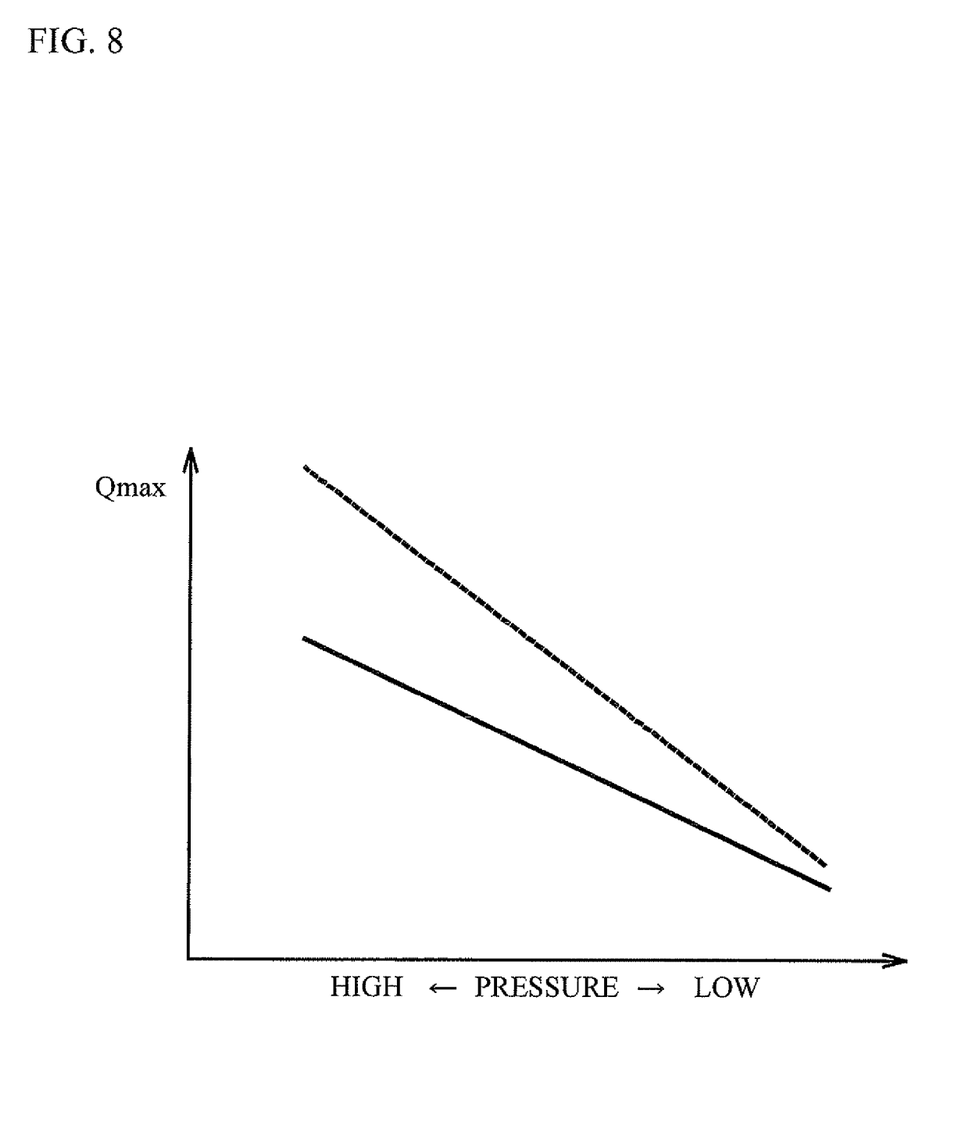
FIG. 8 is a map defining a relationship between the atmospheric pressure and the heat radiation permission heat quantity.

The difference becomes smaller between the heat radiation permission heat quantity Qmax in cases where the exhaust gas temperature is performed and the heat radiation permission heat quantity Qmax after the exhaust gas temperature control is finished, as the atmospheric pressure is lower. FIG. 8 is a map defining a relationship between the atmospheric pressure and the heat radiation permission heat quantity Qmax. The solid line indicates the heat radiation permission heat quantity Qmax in cases where the exhaust gas temperature control is being performed. The dashed line indicates the heat radiation permission heat quantity Qmax for a given period after the exhaust gas temperature control is finished. The reason why the amount of the correction is smaller as the atmospheric pressure is lower is as follows. The coolant readily boils as the atmospheric pressure is lower. For this reason, in cases where the amount of the correction is set to be constant without consideration of the atmospheric pressure, even when the atmospheric pressure is low, the exhaust gas temperature control might be not performed for a given period after the exhaust gas temperature control is finished, and then the coolant temperature might be increased. However, the amount of the correction is set to be smaller as the atmospheric pressure is lower, thereby preventing the period while the exhaust gas temperature control is not performed from becoming longer.

Additionally, in the exhaust gas temperature control according to the third variation, the number of the repeat of the exhaust gas temperature control is not limited to twice.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A control device for an internal combustion engine, comprising:
    an exhaust manifold connected to the internal combustion engine;
    a cooling unit arranged on a path where a coolant is circulated, the cooling unit being configured to cool an exhaust gas flowing through the exhaust manifold from the internal combustion engine with the coolant flowing through the cooling unit, the cooling unit being attached with the exhaust manifold;
    a heat quantity estimation portion configured to estimate a heat quantity, in the cooling unit, transferred from the exhaust gas flowing through the exhaust manifold to the coolant flowing though the cooling unit;
    an atmosphere pressure detection portion configured to detect an atmosphere pressure; and
    an engine control portion configured to:
        decide whether or not to perform an exhaust gas temperature control for suppressing a temperature of the exhaust gas based on whether or not the heat quantity is more than a decision value;
        correct the decision value to be lower as the atmosphere pressure is lower;
        calculate the decision value based on a heat quantity capable of being radiated from the coolant; and
        perform the exhaust gas temperature control for suppressing the temperature of the exhaust gas when the heat quantity is more than the decision value.

2. The control device for the internal combustion engine of claim 1, wherein the engine control portion is further configured to correct the decision value while the exhaust gas temperature control is being performed to be lower than the decision value when the exhaust gas temperature control is not performed.

3. The control device for the internal combustion engine of claim 1, wherein the engine control portion is further configured to correct the decision value after the exhaust gas temperature control is performed so as to be higher than the decision value when the exhaust gas temperature control is performed.

4. The control device for the internal combustion engine of claim 2, wherein the engine control portion is further configured to change a correction amount of the decision value based on the atmosphere pressure.

5. The control device for the internal combustion engine of claim 2, wherein the engine control portion is further configured to increase a correction amount of the decision value as the atmosphere pressure is lower.

6. The control device for the internal combustion engine of claim 3, wherein the engine control portion is further configured to reduce a correction amount of the decision value as the atmosphere pressure is lower.

* * * * *